United States Patent
Larsen (10) Patent No.: US 11,761,428 B2
(45) Date of Patent: Sep. 19, 2023

(54) ICE SHIELD FOR TOWER MOUNTED EQUIPMENT

(71) Applicant: Vestas Wind Systems A/S, Aarhus N. (DK)

(72) Inventor: Erik Larsen, Randers NV (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/612,042

(22) PCT Filed: Jun. 2, 2020

(86) PCT No.: PCT/DK2020/050157
§ 371 (c)(1),
(2) Date: Nov. 17, 2021

(87) PCT Pub. No.: WO2020/244719
PCT Pub. Date: Dec. 10, 2020

(65) Prior Publication Data
US 2022/0228570 A1 Jul. 21, 2022

(30) Foreign Application Priority Data

Jun. 4, 2019 (DK) .......................... PA 2019 70360

(51) Int. Cl.
*E02B 17/00* (2006.01)
*F03D 80/00* (2016.01)
(Continued)

(52) U.S. Cl.
CPC .......... *F03D 80/00* (2016.05); *E02B 17/0021* (2013.01); *E04B 1/92* (2013.01);
(Continued)

(58) Field of Classification Search
CPC ........ F03D 80/00; E02B 17/0021; E04B 1/92; E04H 12/187
(Continued)

(56) References Cited

U.S. PATENT DOCUMENTS 3,861,410 A * 1/1975 Cognet .................. A45B 11/00
52/73
4,126,864 A 11/1978 Hopkins
(Continued)

FOREIGN PATENT DOCUMENTS

CN 201364946 Y 12/2009
CN 103966992 A 8/2014
(Continued)

OTHER PUBLICATIONS

Danish Patent and Trademark Office, Search and Examination Report in PA 2019 70360, dated Oct. 29, 2019.
(Continued)

*Primary Examiner* — Brent W Herring
(74) *Attorney, Agent, or Firm* — Wood Herron & Evans LLP (57) ABSTRACT

A tower (1) having equipment (3) mounted thereon is disclosed. The tower (1) has an ice shield assembly (2) for protection to of the equipment (3) against falling ice mounted thereon. The ice shield assembly (2) comprises a tower fixture arrangement (5) being secured to the tower (1) and an ice shield (4) connected 5 to the tower fixture arrangement (5) via a hinge (6). The ice shield (4) is configured for vertically overlapping the horizontal extends of the equipment (3). The ice shield assembly (2) further comprises at least one spring element (7), e.g. in the form of a curved rod, connected at one end to the ice shield (4) and at an opposite end to the tower (1), the at least one spring element (7) 10 being configured to allow the ice shield (4)
(Continued)

to pivot relative to the tower (1) at the hinge (6) in order to ensure a gradual transfer of energy from falling ice, which collides with the ice shield (4).

13 Claims, 5 Drawing Sheets

(51) Int. Cl.
  *F03D 13/20* (2016.01)
  *E04H 12/18* (2006.01)
  *E04B 1/92* (2006.01)
  *H01Q 1/42* (2006.01)
  *H01Q 1/00* (2006.01)
(52) U.S. Cl.
  CPC ............ *E04H 12/187* (2013.01); *F03D 13/20* (2016.05); *H01Q 1/428* (2013.01); *H01Q 1/002* (2013.01)
(58) Field of Classification Search
  USPC ............... 52/73, 74, 24, 29, 32, 40; 405/211
  See application file for complete search history.

(56) References Cited

U.S. PATENT DOCUMENTS

| | | | |
|---|---|---|---|
| 4,738,566 A * | 4/1988 | Marthinsen | B63B 1/107 |
| | | | 405/211 |
| 4,799,067 A * | 1/1989 | Tekip | H01Q 1/1242 |
| | | | 343/890 |
| 7,201,429 B1 * | 4/2007 | Lange | B60R 19/52 |
| | | | 296/115 |
| 7,732,708 B1 | 6/2010 | Peabody | |
| 9,567,982 B1 | 2/2017 | Gozewski et al. | |
| 2011/0185676 A1 | 8/2011 | Horn | |
| 2011/0271608 A1 * | 11/2011 | Egan | E04H 12/2261 |
| | | | 52/651.07 |
| 2011/0279347 A1 * | 11/2011 | Pass | E04G 3/243 |
| | | | 343/890 |
| 2015/0013239 A1 * | 1/2015 | Sicking | E04H 3/10 |
| | | | 52/71 |

FOREIGN PATENT DOCUMENTS

| | | |
|---|---|---|
| CN | 204961173 U | 1/2016 |
| CN | 205646163 U | 10/2016 |
| CN | 108105040 A | 6/2018 |
| CN | 108286356 A | 7/2018 |
| DE | 102014110986 A1 | 9/2014 |
| EP | 2275677 | 1/2011 |
| SU | 763566 A1 | 9/1980 |
| WO | 2017184830 A1 | 10/2017 |

OTHER PUBLICATIONS

European Patent Office, International Search Report and Written Opinion in PCT Application No. PCT/DK2020/050157, dated Aug. 27, 2020.

China National Intellectual Property Administration, office action issued in corresponding Chinese Patent Application No. 202080041559.2, dated Apr. 25, 2023, with English translation.

* cited by examiner

ICE SHIELD FOR TOWER MOUNTED EQUIPMENT

FIELD OF THE INVENTION

The present invention relates to a tower, such as a wind turbine tower, with an ice shield assembly for protecting equipment mounted on the tower from falling ice. The ice shield assembly mounted on the tower of the invention reduces the impact introduced to the tower. The present invention further relates to an ice shield assembly mounted on such a tower.

BACKGROUND OF THE INVENTION

Wind turbine generators and other types of tall towers, such as communication towers and structures, may be situated in cold climates. In this case, large amounts of ice may form on surfaces of the above-mentioned structures. The ice can weigh several kilos and break off the surfaces of the structures and fall down. Furthermore, such structures may have various equipment, such as radars, sensors and electronics mounted thereon. The large falling ice parts may collide with the tower mounted equipment and cause damage thereto.

In order to protect the tower mounted equipment against falling ice parts, wind turbine towers have previously been provided with ice shields mounted on the tower above the equipment.

Thus, U.S. Pat. No. 9,567,982 discloses an ice shield assembly for protection of tower mounted equipment. The ice shield assembly enables vertical translation of the ice shield such that when ice collides with the ice shield, the ice shield assembly will move in a vertical direction. This ice shield assembly of U.S. Pat. No. 9,567,982 further comprises a shock absorber incorporated into the ice shield assembly.

DESCRIPTION OF THE INVENTION

It is an object of embodiments of the invention to provide a tower with an ice shield assembly in which impact to the tower originating from falling ice is reduced as compared to prior art towers.

It is a further object of embodiments of the invention to provide an ice shield assembly to be mounted on a tower in which impact to the tower originating from falling ice is reduced as compared to prior art ice shield assemblies.

According to the first aspect the invention provides a tower having equipment mounted thereon, the tower further having an ice shield assembly for protection of the equipment against falling ice mounted thereon, the ice shield assembly comprising:
- a tower fixture arrangement, the tower fixture arrangement being secured to the tower,
- an ice shield connected to the tower fixture arrangement via a hinge, the ice shield being configured for vertically overlapping the horizontal extends of the equipment, and
- at least one spring element, connected at one end to the ice shield and at an opposite end to the tower, wherein the at least one spring element is configured to allow the ice shield to pivot relative to the tower at the hinge in order to absorb energy from falling ice, which collides with the ice shield.

Thus, according to the first aspect, the invention provides a tower. In the present context the term 'tower' should be interpreted to mean a structure defining a longitudinal direction, i.e. a direction in which the dimensions of the structure are larger than the dimensions in any other directions. When the tower has been erected, the longitudinal direction would normally be arranged in a substantially vertical direction.

The tower may be free-standing or forming part of a building. Examples of such towers are, e.g., wind turbine towers and telecommunication towers.

The tower has equipment mounted thereon, i.e. equipment is attached to an outer surface of the tower. The equipment could, e.g., be electronic equipment such as radars, antennas, sensors or transducers with the purpose of measuring various parameters.

The tower further has an ice shield assembly mounted thereon. The ice shield assembly comprises a tower fixture arrangement, an ice shield and at least one spring element.

The tower fixture arrangement is secured to the tower. Thus, in the present context, the term 'tower fixture arrangement' should be interpreted to mean an arrangement that is fixed or attached to the tower as a permanent appendage or as a structural part of the tower with the purpose of allowing items to be fixed onto an outer surface of the tower. Such a tower fixture arrangement could, e.g., be or comprise one or more ring metal belts being secured around the tower via suitable clamps or tighteners.

The ice shield is connected to the tower fixture arrangement. Thus, the ice shield is fixed to the tower via the tower fixture arrangement. Furthermore, the ice shield is connected to the tower fixture arrangement via a hinge. Thereby the ice shield is allowed to move relative to the tower fixture arrangement, and thus relative to the tower, via the hinge.

The ice shield is further configured for vertically overlapping the horizontal extends of the equipment. Thus, the ice shield extends from the tower in a direction which is not parallel to the longitudinal direction of the tower, i.e. which forms an angle relative to the longitudinal direction. Furthermore, the ice shield extends in this direction sufficiently to ensure that it covers the tower mounted equipment horizontally. In the case that the ice shield is mounted above the equipment, the ice shield may thereby protect the tower mounted equipment from falling objects, such as falling lumps of ice.

Thus, in the present context, the term 'ice shield' should be understood as a shield which is capable of providing protection for objects arranged below the ice shield, e.g. from falling ice. The planar ice shield may have a substantially planar shape, e.g. having a surface which is substantially arranged within a plane. Alternatively, it may have a curved shape.

The ice shield may be made out of materials suitable for resisting impact and forces from large and heavy objects, such as falling ice lumps from the tower. The ice shield may have a circumference with any suitable shape for protection, e.g. oval, round or square. The shape of the ice shield may advantageously be selected in such a manner that it is as easy as possible to manufacture, while taking into account that the ice shield should be able to cover the tower mounted equipment.

The at least one spring element is connected to the ice shield in one end and at an opposite end to the tower. Thus the at least one spring element interconnects the ice shield and the tower.

In the present context the term 'spring element' should be interpreted to mean an element which provides a spring effect, i.e. which is compliant in the sense that it is capable of allowing relative movements between the two parts which it interconnects, in this case the ice shield and the tower, respectively.

Thus, the at least one spring element may slow down the movement of the ice shield during an impact with an object. Thereby the transfer of energy from the ice shield to the tower, due to the impact, takes place gradually, i.e. the energy is transferred during a time interval, rather than instantaneously as would be the case if the energy had not been transferred via a spring element. Accordingly, the energy transfer from the ice shield to the tower per unit time is reduced as compared to a situation where there are no spring elements, and the entire energy would be transferred instantaneously, or within a very small time interval. In other words, the peak energy transfer is reduced. This reduces the impact on the tower, e.g. in terms of peak loads and fatigue.

Since the ice shield is fixed to the tower via the hinge, it is allowed to perform pivoting movements relative to the tower. Furthermore, when the ice shield performs such pivoting movements, the spring element(s) slows down the movement, as described above. Accordingly, in case of an impact between the ice shield and a falling object, such as a lump of ice, the energy of the impact is transferred gradually to the tower over a time interval, due to the spring effect provided by the spring element(s). As a consequence, the peak energy transfer to the tower is reduced. Thereby the tower mounted equipment is protected from falling objects, while the impact on the tower, e.g. in terms of peak loads and fatigue, is significantly reduced, thereby increasing the lifetime of the tower.

The at least one spring element may be or form part of a deflectable rod. According to this embodiment, the spring effect is provided as an inherent property of the rod, in the sense that the rod will deflect when subjected to loads, in particular when the ice shield performs pivoting movements as described above As an alternative, the spring element could be in the form of a spring, such as a compressible spring, e.g. attached to an end of a rod interconnecting the ice shield and the tower, or in the form of a compressible material. As another alternative, the spring element could include a hydraulic cylinder or the like.

The at least one deflectable rod may have a curved shape. According to this embodiment, the rod is deflectable due to the curved shape. This is a simple and reliable manner of ensuring that the rod is sufficiently deflectable to provide the necessary spring effect to handle the energy from falling objects.

The at least one deflectable rod may be arranged substantially tangentially relative to the tower at the connecting position between the rod and the tower. Thus, the rod is connected to the tower at a point where it touches the wall of the tower, but would not, if extended, intersect the wall of the tower. This manner of positioning the rod relative to the tower ensures that the energy originating from load impact from falling objects, which is transferred from the rod to the tower, is lead along the wall of the tower, rather than being transferred directly and substantially perpendicularly into the wall of the tower. This provides a significant reduction of load impact on the tower.

The hinge may be a spherical joint. A spherical joint provides more degrees of freedom in angular movement, more specifically it is possible to pivot freely around one point. Thereby the ice shield is allowed to pivot in multiple directions in response to impact between falling objects and the ice shield. Thus, the ice shield is capable of handling uneven loads originating from falling objects impacting the ice shield at various positions.

As an alternative, the hinge could be in the form of another hinge type, such as a hinge defining only one axis of rotation, e.g. a gate hinge.

The ice shield assembly may comprise at least two spring elements, each spring element being connected at one end to the ice shield and at an opposite end to the tower at different positions on the tower. Thus, according to this embodiment, the at least two spring elements are not connected to the tower at the same position. Thereby the loads transferred from the spring elements to the tower are distributed between at least two positions at the tower. Thus, no single point on the tower is subjected to the total load, and thereby the risk of weak points on the tower is minimised.

The at least two spring elements could, e.g., be connected to the tower at opposite sides of the ice shield, along a substantially horizontal direction. In this case the ice shield assembly will be able to handle uneven loads originating from falling objects impacting the ice shield at various positions more easily, because the spring elements are capable of slowing down the movement of the ice shield along various directions and from various positions of the ice shield. Furthermore, the stability to the ice shield assembly is improved.

For instance, the at least two spring elements may be connected at opposite sides of the tower.

As an alternative, the at least two spring elements may be connected to the tower at the same side of the ice shield at different positions.

The at least one spring element may be connected to the ice shield via a hinge. According to this embodiment, the hinge interconnecting the spring element and the ice shield facilitates movement between the ice shield and the spring element. This provides an increased flexibility to the ice shield assembly, thereby allowing improved handling of uneven loads.

The hinge interconnecting the ice shield and the spring element may be a spherical joint, thus providing more degrees of freedom in angular movement. As described above, the use of a spherical joint is a simple and reliable manner of ensuring that the hinge may allow relative movement in more than one angular direction.

As an alternative, other hinge types may be used, as described above.

The ice shield may be deflectable. According to this embodiment, the ice shield is capable of deflecting in response to loads, e.g. originating from falling objects, such as lumps of ice. Thereby the ice shield itself is capable of absorbing loads originating from falling objects, thereby reducing the loads which are transferred to the tower.

The tower may be a wind turbine tower. According to this embodiment, the tower forms part of a wind turbine. Accordingly, in this case the tower will normally carry a nacelle, carrying a rotor and a set of wind turbine blades mounted thereon. The nacelle may be mounted on top of the tower, but may also be mounted on other parts of the tower, e.g. in the case that the wind turbine is a multirotor wind turbine comprising two or more rotors.

As an alternative, the tower could be a telecommunication tower or any other suitable kind of tower.

The equipment may be or comprise a radar. Alternatively or additionally, the equipment could be in the form of antennas, sensors, transducers, or any other suitable kind of equipment which may be mounted on a tower and be in need of protection from falling objects.

According to a second aspect the invention provides an ice shield assembly for protection of tower mounted equipment against falling ice, the ice shield assembly being configured to be mounted on a tower according to the first aspect of the invention, the ice shield assembly comprising:
- a tower fixture arrangement configured to be secured to the tower,
- an ice shield configured to be connected to the tower fixture arrangement via a hinge, the ice shield being configured for vertically overlapping the horizontal extends of the equipment, and
- at least one spring element, configured to be connected at one end to the ice shield and at an opposite end to the tower, wherein the at least one spring element is configured to allow the ice shield to pivot relative to the tower at the hinge in order to absorb energy from falling ice, which collides with the ice shield.

The ice shield assembly according to the second aspect of the invention is configured to be mounted on a tower according to the first aspect of the invention. The remarks set forth above with reference to the first aspect of the invention are therefore equally applicable here.

Thus, according to the second aspect, the invention provides an ice shield assembly comprising a tower fixture arrangement, an ice shield, a hinge and at least one spring element. This has already been described in detail above.

BRIEF DESCRIPTION OF THE DRAWINGS

The present invention will now be explained in further details with reference to the accompanying drawings, in which.

DETAILED DESCRIPTION OF THE DRAWINGS

Figure 1:
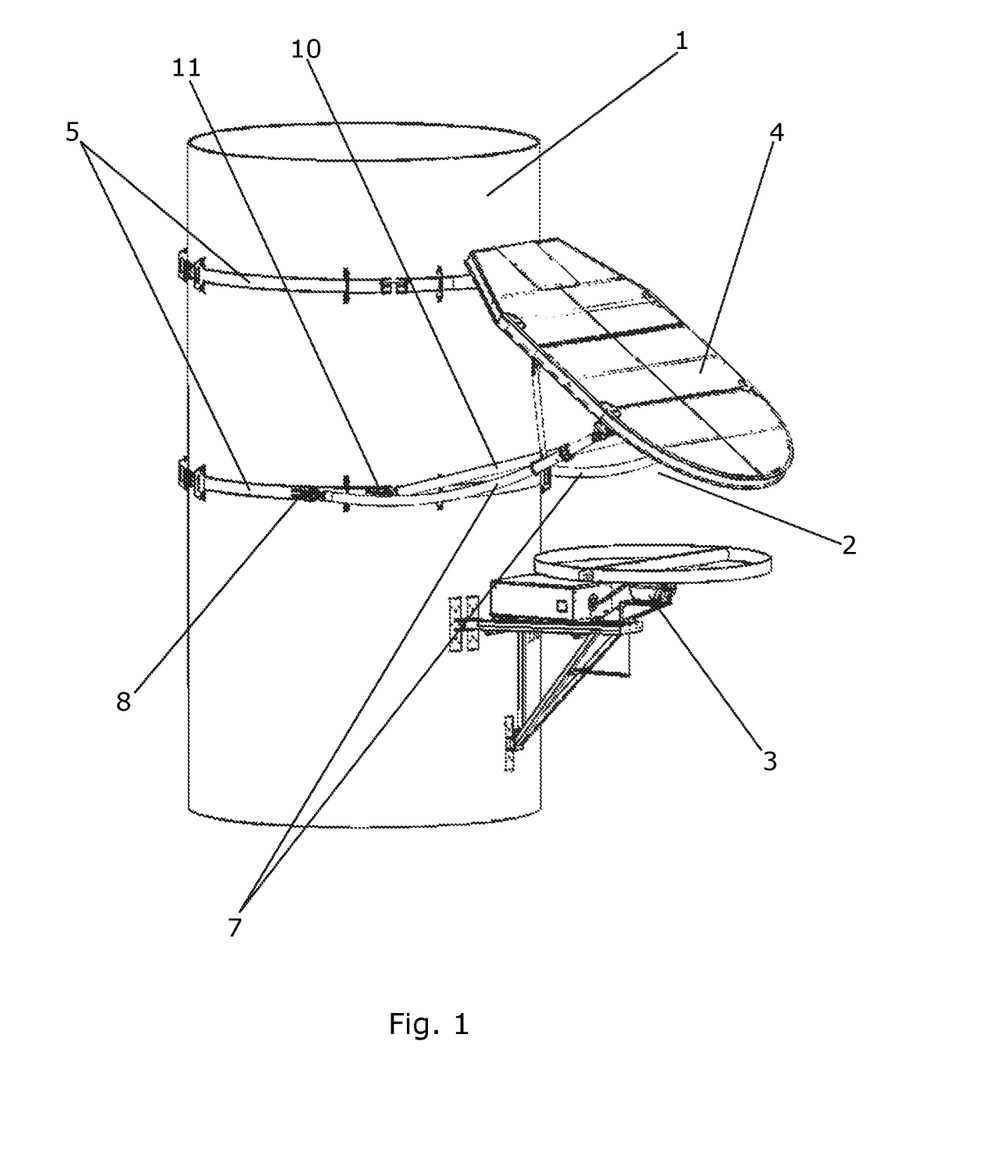
FIGS. 1-5 illustrate a part of a tower with an ice shield assembly according to an embodiment of the invention, seen from various directions.
Figure 2:
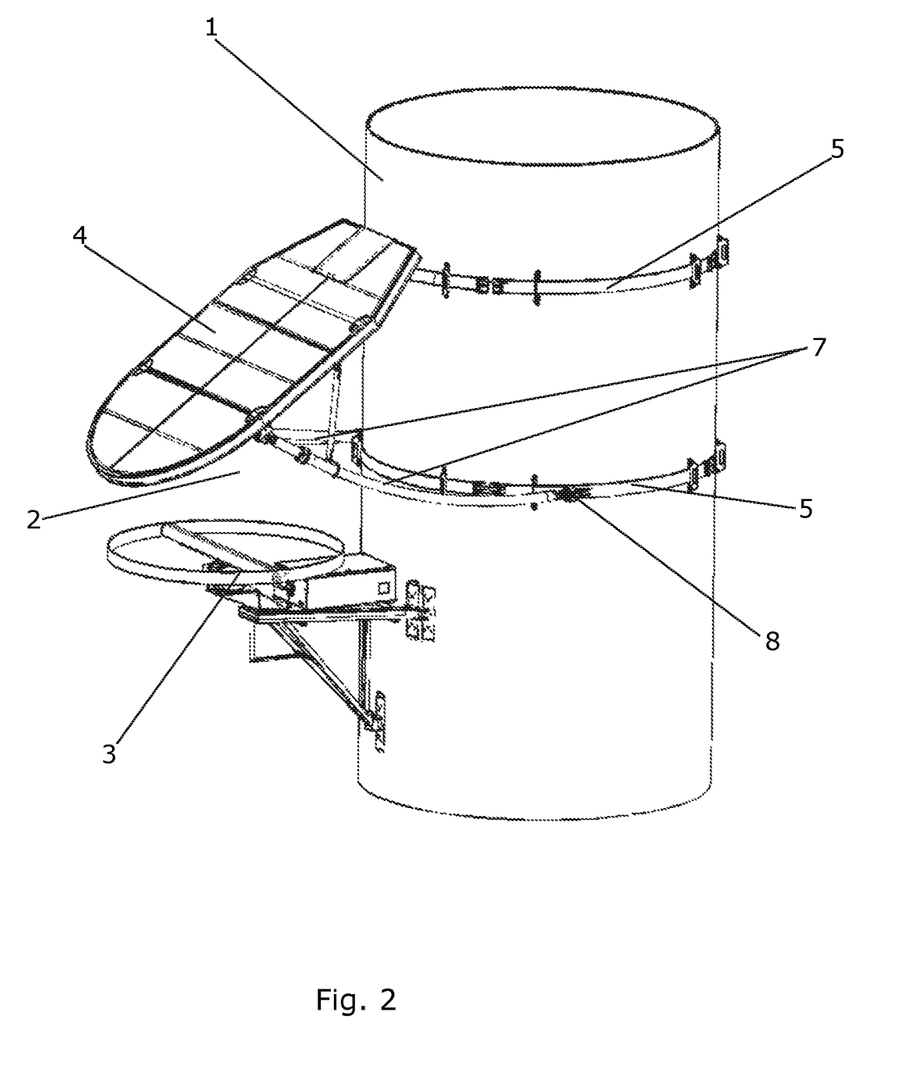
Figure 3:
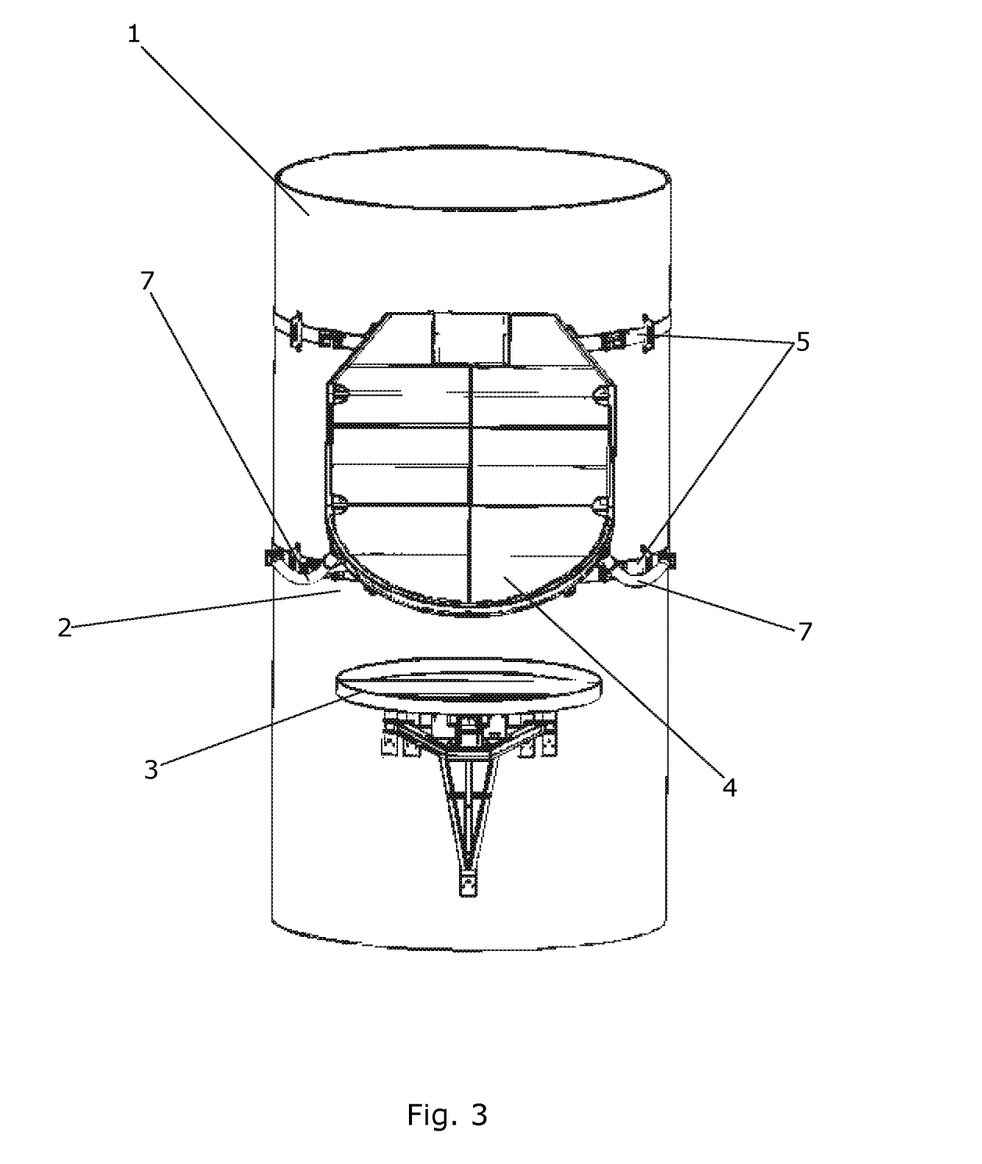
Figure 4:
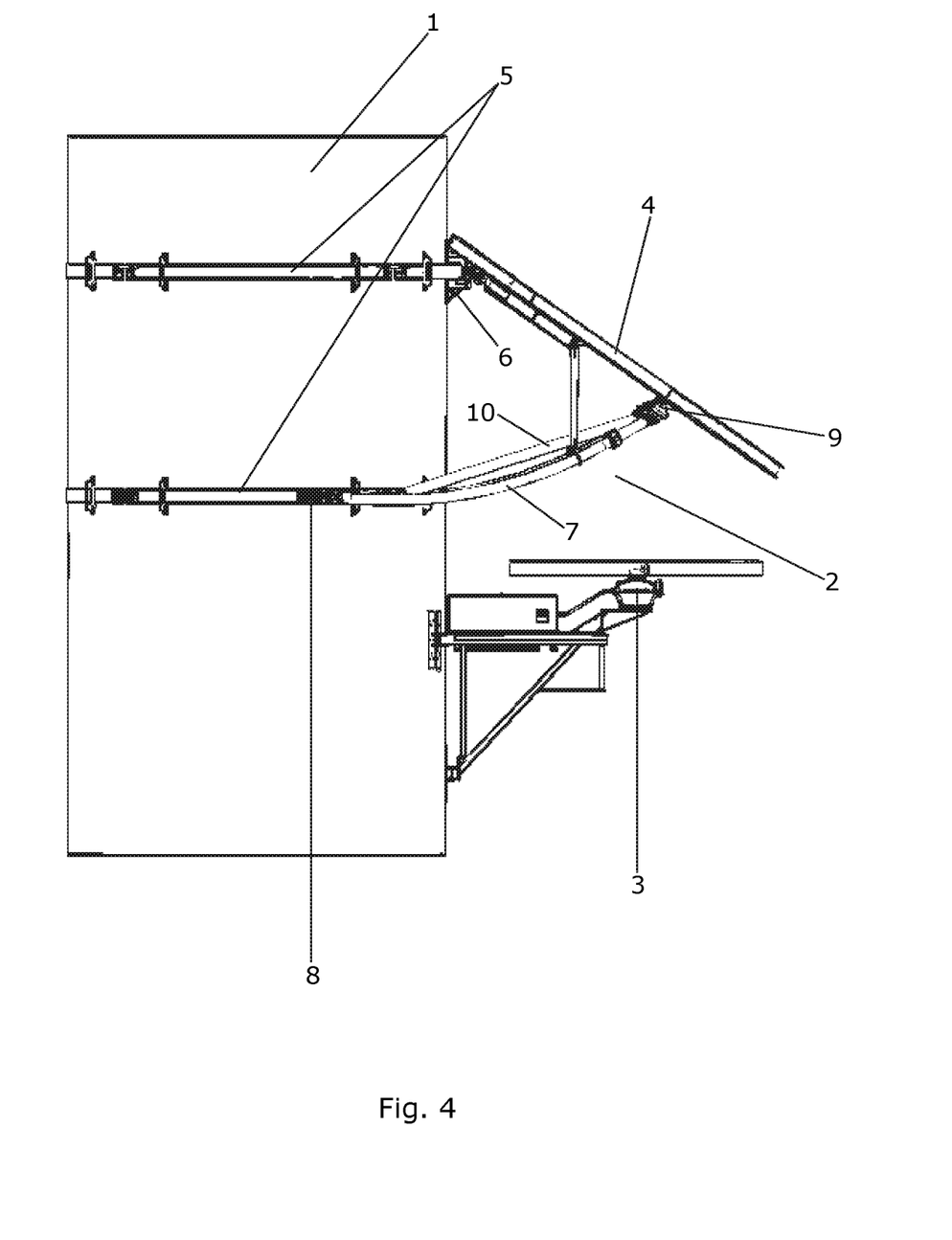
Figure 5:
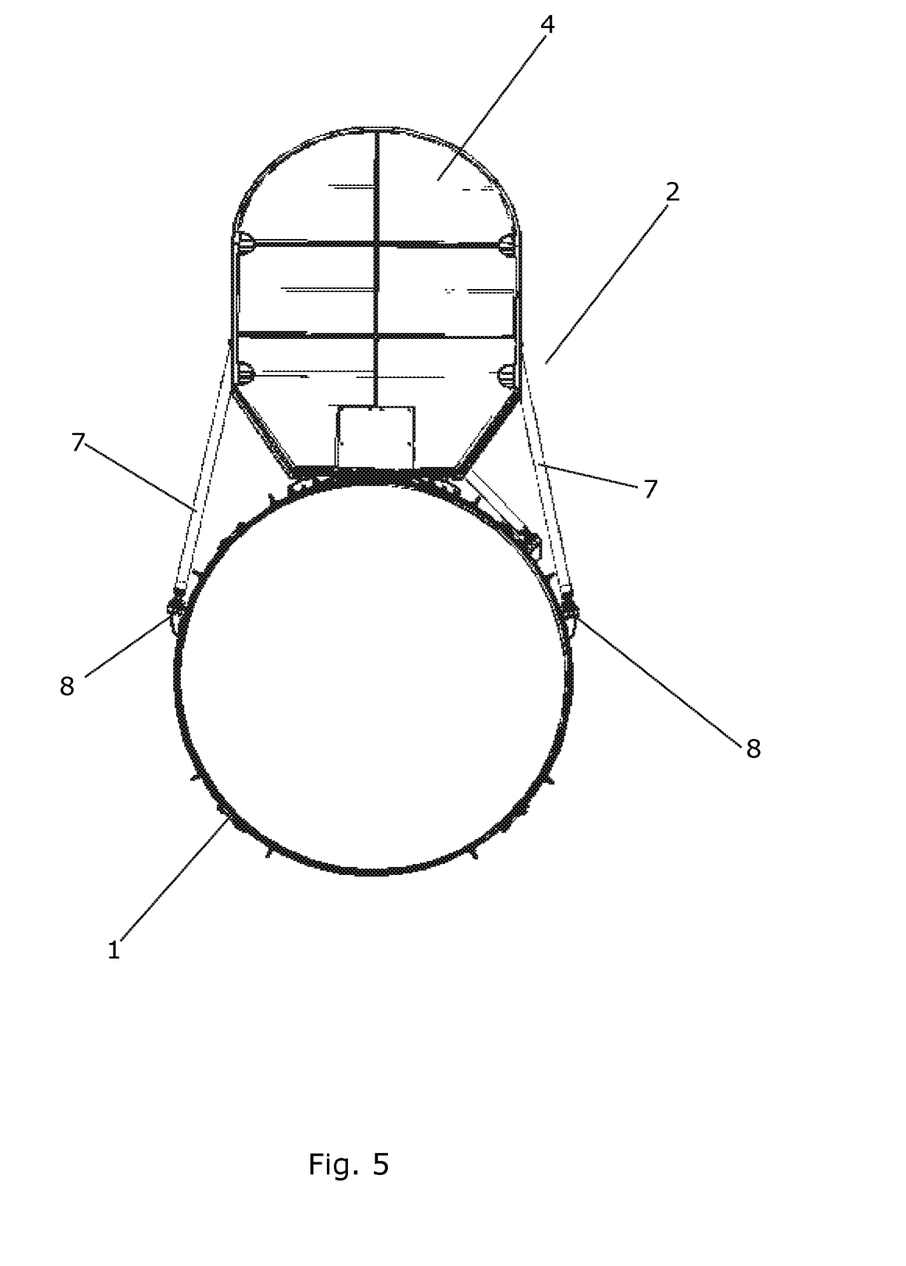

FIGS. 1-5 illustrate a part of a tower 1 according to an embodiment of the invention. FIGS. 1-4 are side views of the tower 1 and FIG. 5 is a top view of the tower 1. The tower 1 has an ice shield assembly 2 and equipment 3, in the form of a radar, mounted thereon. The ice shield assembly 2 comprises an ice shield 4, arranged at a position above the equipment 3, and extending horizontally in such a manner that it overlaps the equipment, thus covering and protecting the equipment 3 from falling objects, as best seen in FIGS. 4 and 5.

The ice shield 4 is connected to the tower 1 via a tower fixture arrangement 5, in the form of ring metal belts, and via a hinge 6. In the embodiment of FIGS. 1-5 the hinge 6 is a spherical joint. Thereby the ice shield 4 is allowed to perform pivoting movements relative to the tower 1.

Two spring elements, in the form of deflectable rods 7, are connected at one end to the ice shield 4 and at an opposite end to the tower 1, via the tower fixture arrangement 5. The rods 7 have a curved shape, which ensures that the rods 7 are deflectable. Thereby the rods 7 are able to deflect, providing a spring effect, in response to movements of the ice shield 4 caused by falling objects, such as lumps of ice, impacting the ice shield 4. Thereby the rods 7 are able to slow down the pivotal movement of the ice shield 4 in response to the impact, thereby reducing the peak energy transferred to the tower 1 and reducing the resulting impact on the tower 1, e.g. in terms of peak loads and fatigue.

Thus, since the ice shield 4 is connected to the tower 1 via the hinge 6 and the two deflectable rods 7, the ice shield assembly 2 is capable of ensuring that energy originating from impacts between falling objects and the ice shield 4 is transferred gradually to the tower 1, because the ice shield 4 can pivot at the hinge 6, and the pivoting movement is slowed down due to the spring effect provided by the deflectable rods 7.

The rods 7 are connected to the ice shield 4 via hinges 9, as best seen in FIG. 4. The hinges 9 facilitate movement between the ice shield 4 and the rods 7, which provides an increased flexibility to the ice shield assembly 2, thereby allowing improved handling of uneven loads, caused by falling object impacting the ice shield 4 at various positions of the ice shield 4, since it improves the ability of the ice shield 4 to move in multiple angular directions.

The two rods 7 are connected to the tower 1 at two different connecting positions 8. In the embodiment of FIGS. 1-5, the two connecting positions 8 are arranged at opposite sides of the ice shield 4, along a substantially horizontal direction, as best seen in FIGS. 3 and 5. By doing so, the ice shield assembly 2 will be able to handle uneven loads originating from falling objects impacting the ice shield 4 at various positions more easily. This is due to the rods 7 being capable of slowing down the movement of the ice shield 4 along various directions and from various positions of the ice shield 4. Furthermore, the stability to the ice shield assembly 2 is improved.

The rods 7 are arranged substantially tangentially relative to the tower 1 at the connecting positions 8 between the rods 7 and the tower 1, as best seen in FIGS. 3 and 5. Thereby it is ensured that the energy originating from load impact from falling objects which is transferred from the rods 7 to the tower 1 is lead along the wall of the tower 1, thereby reducing the load impact on the tower 1.

A rod 10 having a substantially linear shape is interconnected between the tower 1, at a connecting position 11 arranged on the tower 1, and the ice shield 4. This rod 10 adds a further stability to the ice shield assembly 2, due to its substantially linear shape, thereby stiffening the construction.

In case of an impact between the ice shield 4 and a falling object, the ice shield 4 pivots at the hinge 6, and the pivoting movement is slowed down due to the spring effect provided by the rods 7. Thereby the transfer of energy from the ice shield 4 to the tower 1 takes place gradually, and the peak energy transfer is reduced. This reduces the impact on the tower 1, e.g. in terms of peak loads and fatigue. The energy is transferred from the rods 7 and distributed between the connecting positions 8 at the tower 1. Thereby no single point on the tower is subjected to the total load, and the risk of damaging the tower 1 and creating weak points is minimised.

The invention claimed is:

1. A tower having equipment mounted thereon, the tower further having an ice shield assembly for protection of the equipment against falling ice mounted thereon, the ice shield assembly comprising:
   - a tower fixture arrangement, the tower fixture arrangement being secured to the tower,
   - an ice shield connected to the tower fixture arrangement via a hinge, the ice shield being configured for vertically overlapping the horizontal extends of the equipment, and
   - at least one spring element, connected at one end to the ice shield and at an opposite end to the tower, wherein the at least one spring element is configured to allow the ice shield to pivot relative to the tower at the hinge in order to absorb energy from falling ice, which collides with the ice shield.

2. The tower according to claim 1, wherein the at least one spring element is or forms part of a deflectable rod.

3. The tower according to claim 2, wherein the at least one deflectable rod has a curved shape.

4. The tower according to claim 2, wherein the at least one rod is arranged substantially tangentially relative to the tower at the connecting position between the rod and the tower.

5. The tower according to claim 1, wherein the hinge is a spherical joint.

6. The tower according to claim 1, wherein the ice shield assembly comprises at least two spring elements, each spring element being connected at one end to the ice shield and at an opposite end to the tower at different positions on the tower.

7. The tower according to claim 1, wherein the at least one spring element is connected to the ice shield via a hinge.

8. The tower according to claim 1, wherein the ice shield is deflectable.

9. The tower according to claim 1, wherein the tower is a wind turbine tower.

10. The tower according to claim 1, wherein the equipment is or comprises a radar.

11. The tower according to claim 1, wherein the ice shield defines a planar surface.

12. The tower according to claim 1, wherein the one end of the at least one spring element is connected to a side of the ice shield.

13. An ice shield assembly for protection of tower mounted equipment against falling ice, the ice shield assembly being configured to be mounted on a tower according to claim 1, the ice shield assembly comprising:
- a tower fixture arrangement configured to be secured to the tower,
- an ice shield configured to be connected to the tower fixture arrangement via a hinge, the ice shield being configured for vertically overlapping the horizontal extends of the equipment, and
- at least one spring element, configured to be connected at one end to the ice shield and at an opposite end to the tower,
- wherein the at least one spring element is configured to allow the ice shield to pivot relative to the tower at the hinge in order to absorb energy from falling ice, which collides with the ice shield.

* * * * *